United States Patent
Mech et al.

(10) Patent No.: US 10,810,721 B2
(45) Date of Patent: Oct. 20, 2020

(54) DIGITAL IMAGE DEFECT IDENTIFICATION AND CORRECTION

(71) Applicant: Adobe Inc., San Jose, CA (US)

(72) Inventors: Radomir Mech, Mountain View, CA (US); Ning Yu, Charlottesville, VA (US); Xiaohui Shen, San Jose, CA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/458,826

(22) Filed: Mar. 14, 2017

(65) Prior Publication Data

US 2018/0268533 A1     Sep. 20, 2018

(51) Int. Cl.
*G06T 7/00* (2017.01)
*G06N 3/08* (2006.01)
*G06N 3/04* (2006.01)

(52) U.S. Cl.
CPC ......... *G06T 7/0002* (2013.01); *G06N 3/0454* (2013.01); *G06N 3/08* (2013.01); *G06T 2207/20081* (2013.01); *G06T 2207/20084* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 7,747,070 B2 * | 6/2010 | Puri | G06N 3/063 382/157 |
| 7,813,545 B2 | 10/2010 | Ovsiannikov | |
| 9,996,768 B2 * | 6/2018 | Shen | G06K 9/4628 |
| 10,037,601 B1 * | 7/2018 | Ben-Ari | G06K 9/4604 |
| 10,468,142 B1 * | 11/2019 | Abou Shousha | A61B 3/0025 |
| 10,489,959 B2 * | 11/2019 | Simons | G06T 5/002 |
| 10,497,122 B2 * | 12/2019 | Zhang | G06T 3/40 |
| 10,515,443 B2 * | 12/2019 | Shen | G06N 3/0454 |
| 10,593,023 B2 * | 3/2020 | Chang | G06K 9/036 |
| 10,645,368 B1 * | 5/2020 | Yu | H04N 13/271 |
| 2005/0002560 A1 * | 1/2005 | Yamamoto | G06K 9/3233 382/156 |
| 2008/0005110 A1 * | 1/2008 | Tsuda | G05B 23/0221 |

(Continued)

OTHER PUBLICATIONS

Borji, A. and Itti, L., Jun. 2012. Exploiting local and global patch rarities for saliency detection. In Computer Vision and Pattern Recognition (CVPR), 2012 IEEE Conference on (pp. 478-485). IEEE. (Year: 2012).*

(Continued)

*Primary Examiner* — Michelle M Entezari

(74) *Attorney, Agent, or Firm* — SBMC

(57) ABSTRACT

Digital image defect identification and correction techniques are described. In one example, a digital medium environment is configured to identify and correct a digital image defect through identification of a defect in a digital image using machine learning. The identification includes generating a plurality of defect type scores using a plurality of defect type identification models, as part of machine learning, for a plurality of different defect types and determining the digital image includes the defect based on the generated plurality of defect type scores. A correction is generated for the identified defect and the digital image is output as included the generated correction.

19 Claims, 11 Drawing Sheets

(56) References Cited

U.S. PATENT DOCUMENTS

| | | | | |
|---|---|---|---|---|
| 2011/0274361 | A1* | 11/2011 | Bovik | G06K 9/00664 |
| | | | | 382/224 |
| 2012/0008673 | A1* | 1/2012 | Suresh | H04N 19/154 |
| | | | | 375/240.01 |
| 2014/0153827 | A1* | 6/2014 | Krishnaswamy | G06T 7/0002 |
| | | | | 382/170 |
| 2014/0358828 | A1* | 12/2014 | Phillipps | G06N 20/00 |
| | | | | 706/12 |
| 2015/0317510 | A1* | 11/2015 | Lee | G06K 9/00228 |
| | | | | 382/118 |
| 2016/0035078 | A1* | 2/2016 | Lin | G06T 7/0002 |
| | | | | 382/157 |
| 2017/0132472 | A1* | 5/2017 | Tao | G06T 7/248 |
| 2018/0144466 | A1* | 5/2018 | Hsieh | G06F 19/00 |

OTHER PUBLICATIONS

Adams,"Gaussian KD-Trees for Fast High-Dimensional Filtering", In ACM Transactions on Graphics (TOG), vol. 28, Jul. 2009, 12 pages.

Avidan,"Seam Carving for Content-Aware Image Resizing", ACM Transactions on Graphics 2007, Jul. 2007, 9 pages.

Baluch,"Mechanisms of top-down attention", Trends in neurosciences, 34(4):, Apr. 2011, 15 pages.

Brajovic,"Brightness Perception, Dynamic Range and Noise: a Unifying Model for Adaptive Image Sensors", In Computer Vision and Pattern Recognition, Jun. 2004, 8 pages.

Chakrabarti,"Analyzing Spatially-varying Blur", Proceedings of IEEE 2 Conference on Computer Vision and Pattern Recognition (CVPR). San Francisco, CA. Jun. 3-18, 2010. pp. 2512-2519, Jun. 2010, 8 Pages.

Cheng,"Global Contrast based Salient Region Detection", IEEE Transactions on Pattern Analysis and Machine Intelligence, Mar. 2015, 14 pages.

Dai,"Motion from Blur", IEEE Conference on Computer Vision and Pattern Recognition, Jun. 24, 2008, 8 pages.

Fang,"Automatic Image Cropping using Visual Composition, Boundary Simplicity and Content Preservation Models", In Proceedings of the 22nd ACM international conference on Multimedia, Nov. 2014, 4 pages.

Fergus,"Removing Camera Shake from a Single Photograph", Retrieved from <http://people.csail.mit.edu/fergus/papers/deblur_fergus.pdf> on Nov. 28, 2012, 2006, 8 pages.

Gal,"Feature-aware texturing", School of Computer Science, Tel Aviv University, Israel; Draft version. The original paper appeared in EGSR '06 proceedings., 2006, 7 pages.

Goferman,"Context-Aware Saliency Detection", IEEE Transactions on Pattern Analysis and Machine Intelligence, Oct. 2012, 8 pages.

He,"Deep Residual Learning for Image Recognition", Dec. 10, 2015, 12 pages.

He,"Single Image Haze Removal Using Dark Channel Prior", In Computer Vision and Pattern Recognition, IEEE Conference on, 2009, 2009, 8 pages.

Ioffe,"Batch Normalization: Accelerating Deep Network Training by Reducing Internal Covariate Shift", Mar. 2015, 11 pages.

Jia,"Caffe: Convolutional Architecture for Fast Feature Embedding", In Proceedings of the 22nd ACM international conference on Multimedia, Nov. 3, 2014, 4 pages.

Kong,"Photo Aesthetics Ranking Network with Attributes and Content Adaptation", Sep. 2016, 16 pages.

Krizhevsky,"ImageNet Classification with Deep Convolutional Neural Networks", In Advances in Neural Information Processing Systems 25, Dec. 3, 2012, 9 pages.

Lazebnik,"Beyond Bags of Features: Spatial Pyramid Matching for Recognizing Natural Scene Categories", CVPR, Jun. 2006, 8 pages.

Liu,"Automatic Image Retargeting with Fisheye-View Warping", ACM UIST, pp. 153-162, 2005, 10 pages.

Liu,"Fast Burst Images Denoising", ACM Transactions on Graphics (TOG), Nov. 2014, 9 pages.

Liu,"Optimizing photo composition", Computer Graphic Forum vol. 29, No. 2, 2010, 2010, 10 pages.

Long,"Fully Convolutional Networks for Semantic Segmentation", IEEE Conference on Computer Vision and Pattern Recognition (CVPR), Nov. 14, 2014, 10 pages.

Lu,"Deep Multi-Patch Aggregation Network for Image Style, Aesthetics, and Quality Estimation", In Proceedings of the IEEE International Conference on Computer Vision, Dec. 2015, 9 pages.

Narasimhan,"Contrast Restoration of Weather Degraded Images", IEEE transactions on pattern analysis and machine intelligence, Jun. 2003, pp. 713-724.

Paris,"A Fast Approximation of the Bilateral Filter Using a Signal Processing Approach", Proceedings of the European Conference on Computer Vision, 2006, 12 pages.

Portilla,"Image Denoising using Scale Mixtures of Gaussians in the Wavelet Domain", IEEE Transactions on Image Processing, vol. 12, No. 11, Nov. 2003, 13 pages.

Ren,"Single Image Dehazing via Multi-Scale Convolutional Neural Networks", In European Conference on Computer Vision, Sep. 2016, 16 pages.

Roth,"Fields of Experts: A Framework for Learning Image Priors", IEEE, Retrieved from <<http://ieeexplore.ieee.org/stamp/stamp.jsp?tp=&isnumber=31473&arnumber=1467533>> on Jun. 19, 2009, 2005, 8 pages.

Russ,"The Image Processing Handbook", CRS press Inc., 1995, 6 pages.

Safonov,"Automatic correction of amateur photos damaged by backlighting", Retrieved at: http://www.graphicon.ru/2006/fe13-24-Safonov.pdf, 2006, 10 pages.

Shwartz,"Blind haze separation", In 2006 IEEE Computer Society Conference on Computer Vision and Pattern Recognition (CVPR'06), vol. 2, 2006, 8 pages.

Sun,"Good image priors for non-blind deconvolution", In European Conference on Computer Vision, Sep. 2014, 16 pages.

Sun,"Learning a convolutional neural network for non-uniform motion blur removal", In 2015 IEEE Conference on Computer Vision and Pattern Recognition (CVPR), Apr. 2015, 9 pages.

Szegedy,"Going deeper with convolutions", In Proceedings of IEEE Conference on Computer Vision and Pattern Recognition, Jun. 7, 2015, 9 pages.

Tang,"Investigating Haze-relevant Features in a Learning Framework for Image Dehazing", IEEE Conference on Computer Vision and Pattern Recognition, Jun. 2014, 9 pages.

Tomasi,"Bilateral Filtering for Gray and Color Images", Proceedings of the 1998IEEE International Conference on Computer Vision, Bombay, India, 1998, 8 Pages.

Tsotsos,"Modeling Visual Attention via Selective Tuning", Jan. 1995, 39 pages.

Yan,"Learning the Change for Automatic Image Cropping", In CVPR, 2013., 2013, pp. 971-978.

Yu,"Multi-Scale Context Aggregation by Dilated Convolutions", Computer Vision and Pattern Recognition, Apr. 2016, 13 pages.

Yuan,"Automatic Exposure Correction of Consumer Photographs", In European Conference on Computer Vision, Oct. 2012, 14 pages.

Yuan,"Image Deblurring with Blurred/Noisy Image Pairs", Proceedings of ACM SIGGRAPH, vol. 26, Issue 3, Jul. 2007, 10 pages.

Zhang,"Top-down Neural Attention by Excitation Backprop", In European Conference on Computer Vision, Aug. 2016, 21 pages.

Zhang,"Unconstrained Salient Object Detection via Proposal Subset Optimization", IEEE Conf. on Computer Vision and Pattern Recognition (CVPR), Apr. 2016, 10 pages.

Zhu,"A Fast Single Image Haze Removal Algorithm Using Color Attenuation Prior", IEEE Transactions on Image Processing, vol. 24, No. 11, Nov. 2015, pp. 3522-3533.

Zhu,"Learning a Discriminative Model for the Perception of Realism in Composite Images", Computer Vision and Pattern Recognition, Oct. 2015, 9 pages.

\* cited by examiner

DIGITAL IMAGE DEFECT IDENTIFICATION AND CORRECTION

BACKGROUND

The capture of digital images has become an increasingly integral part of everyday life. Users, for instance, typically have image capture devices readily available to capture digital images through use of a mobile phone, tablet, and so forth and share those images via social networks, messaging, and so on. The portability of these devices has enabled users to casually capture digital images in a wide range of environments. In some instances, however, the captured digital images include defects due to an environment in which the images are captured, limitations of the image capture device, and so on.

Accordingly, image correction techniques have been developed to correct defects in digital images, which have been employed in a wide range of scenarios including computational photography, computer vision, digital image processing, and so forth. By correcting defects within a digital image, the image correction may improve quality and enhance image aesthetics in digital images. Conventional image correction techniques used to do so, however, are limited to addressing a single type of image defect (e.g., blurring). Conventional image correction techniques also rely on a user to identify existence of the defect and then manually select a technique (e.g., deblur tool) to correct the defect. A user, for instance, may view an image in a user interface of a computing device that is blurry and then manually locate a deblur tool that is usable by the computing device to correct for the image blur. Therefore, conventional techniques rely on a user's ability to both correctly identify the defect and locate a technique to accurately correct the defect and thus require detailed knowledge on the part of the user.

Further, conventional techniques do not consider identification of the defect as a comprehensive problem. As such, conventional techniques do not consider the existence and severity of multiple defects nor possible correlations between defects. For example, conventional techniques do not address co-occurrence of defects within a digital image. Haze, fog, and smoke, for instance, may lead to under saturation of the digital image, a poorly lit digital image may include a bad exposure defect as well as noise, and so forth. Thus, conventional techniques may lack an ability to accurately address and correct these defects.

SUMMARY

Digital image defect identification and correction techniques and systems are described. These techniques are usable by an image defect identification system of a computing device (e.g., locally or "in the cloud") to automatically identify inclusion of different types of defects within a digital image, which is not possible using conventional techniques that rely on a user to manually identify the defect. This identification may then be used as a basis to generate a correction for the defect by the computing device automatically and without user intervention.

The computing device, for instance, may employ multiple defect type identification models that have been trained using machine learning to identify different types of defects that may be included within an image, e.g., exposure, white balance, saturation, noise, haze, blur, or composition. Based on this identification, the computing device then employs a defect correction system to select from several different defect type correction modules that are usable to generation a correction for the identified defect type. In this way, the computing device supports technical advantages over conventional techniques that rely on user accuracy to identify the defect and functionality to correct the defect.

In one example, the identification is performed using both global defect models (e.g., holistic) and local defect models (e.g., patch based) for the different types of image defects to capture both global and fine-grain resolution details. In this way, the techniques described herein may be used to increase accuracy in identification of the defects by the system. Although generation of a correction for the defect is described, other uses of identification of a defect by a computing device include image curation and search, e.g., to curate digital images and/or form image search results to avoid digital images having defects, locate digital images having defects, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
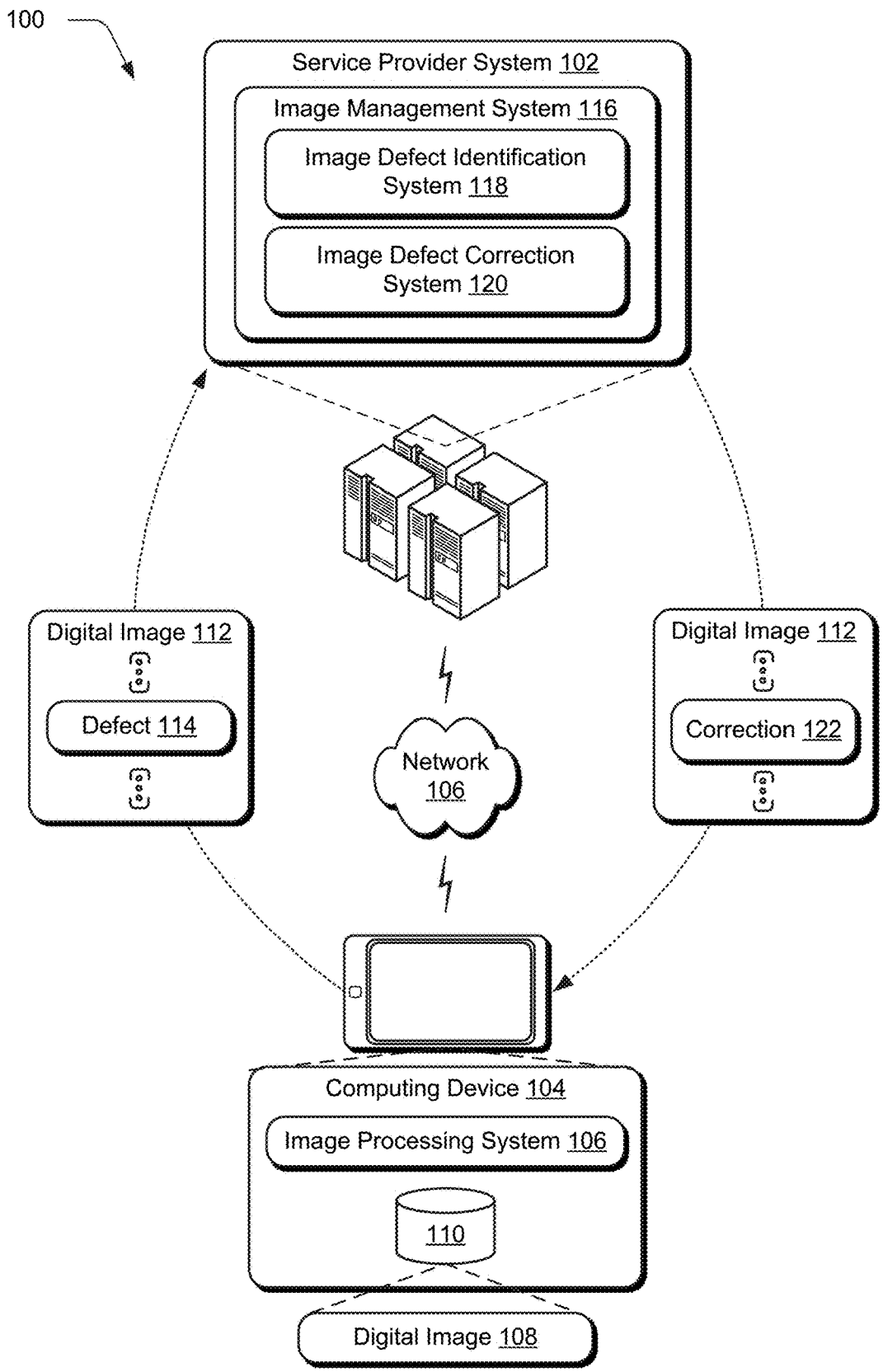
FIG. 1 is an illustration of an environment in an example implementation that is operable to employ digital image defect identification and correction techniques described herein.

Digital image defect identification and correction techniques and systems are described. These techniques are usable by an image defect identification system of a computing device (e.g., locally or "in the cloud") to automatically identify inclusion of different types of defects within a digital image, which is not possible using conventional techniques that rely on a user to manually identify the defect. This identification may then be used as a basis to generate a correction for the defect by the computing device automatically and without user intervention.

Conventional image correction techniques, for instance, although providing an ability for a user to interact with a computing device to correct and thus compensate for a variety of different defects in digital images, rely on the user to manually identify whether the defect is present in the digital image, e.g., when viewed in a user interface. Once identified, the user is also tasked in conventional image correction techniques to locate functions (e.g., within a user interface of a computing device) that are usable to correct the defect.

Thus, conventional image correction techniques are often considered confusing, frustrating, time-consuming, expensive in terms of computational resource consumption, and are prone to error by casual users. A casual user, for instance, may find it difficult to locate particular functionality usable to correct a defect by a computing device, even once the defect is identified. This is typically due to specialized definitions of terminologies and adjustment effects used to describe this functionality in a user interface by conventional image correction techniques. As a result, conventional image correction techniques are typically limited to use by sophisticated users that have spent significant amounts of time to learn this terminology and where functions corresponding to this terminology may be found in a user interface.

Accordingly, digital image defect identification and correction techniques are described. In one example, an image management system includes an image defect identification system and an image defect correction system. The image defect identification system is configured to identify inclusion of several different types of defects within a digital image, which is not possible using conventional techniques that rely on a user to manually identify the defect. The computing device, for instance, may train several different defect type identification models using machine learning, e.g., a deep neural network (DNN). The training is performed using multiple training images having defects (e.g., exposure, white balance, saturation, noise, haze, blur, or composition) as well as indications as to an amount of severity of respective defects, e.g., none, mild, severe. Thus, once trained, each defect type identification model may be utilized to identify a respective defect type as well as a severity of the defect, e.g., via a score. The defect type identification models may also support localization such that a particular location at which the defect occurs within the image may be specified, e.g., through use of a fully convolution network (FCN), which may improve accuracy of subsequent correction techniques.

Identification of the defect may then be used by the image management system to support a variety of functionality. In one example, the image management system employs an image defect correction system to automatically generate a correction for the defect, automatically and without user intervention. The image defect correction system, for instance, may include multiple defect type correction modules, each of which is configured to correct a corresponding defect type, e.g., exposure, white balance, saturation, noise, haze, blur, composition, and so forth. In this way, the image management system may identify and correct defects in digital images automatically and without user intervention, thereby improving user efficiency. These techniques also have technical advantages through improvements gained in efficiency in computational resource consumption through application of image correction techniques that are valid for the digital image. This is contrasted with repeated processing encountered by computing device as part of "best guess" conventional techniques that are user dependent in identifying the defect and applying appropriate corrections. Other examples are also contemplated, including image curation and search, e.g., to curate digital images and/or form image search results to avoid digital images having defects, locate digital images having defects, and so forth In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a service provider system 102 and a computing device 104 that are communicatively coupled, one to another, via a network 106. Configuration of the computing device 104 as well as computing devices that implement the service provider system 102 may differ in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, the computing device may also be representative of multiple different devices, such as multiple servers utilized by a business to perform operations "over the cloud" as illustrated for the service provider system 102 and as described in FIG. 11.

The computing device 104 is illustrated as including an image processing system 106. The image processing system 106 is implemented at least partially in hardware of the computing device 102 to process and transform a digital image 108, which is illustrated as maintained in storage 110 of the computing device 104. Such processing includes creation of the digital image 108, modification of the digital image 108, and rendering of the digital image 108 in a user interface for output, e.g., by a display device. Although illustrated as implemented locally at the computing device 102, functionality of the image processing system 106 may also be implemented as whole or part via functionality available via the network 106, such as part of a web service or "in the cloud."

In the illustrated example, the computing device 104 has captured a digital image 112 having at least one defect 114, that is communicated via the network 106 to the service provider system 102 for correction. The service provider system 102 includes an image management system 116 that is representative of functionality to manage storage, transformation, and distribution of digital images. The image management system 116, for instance, may be part of an online service that is configured to create, maintain, or transform digital images using image processing functionality. In another example, the image management system 116 is configured to curate digital images (e.g., to represent images captured by the user as part on an online account), provide search results for digital images, and so forth.

Examples of functionality of the image management system 116 include an image defect identification system 118 and an image defect correction system 120. The image defect identification system 118 is configured to detect the defect 114 in the digital image 112 automatically and without user intervention. This is not possible using conventional image correction techniques that rely on a user to manually identify the defect 114, which may be prone to error and inefficient. The defect 114, once identified by the image defect identification system 118, is then used by an image defect correction system 120 to generation a correction 122. The digital image 112 having the correction 122 is then illustrated as being communicated back to the computing device 104 via the network 106. Other example uses of a result of identification of the defect 114 in the digital image 112 by the service provider system 102 include image curation and image searches, such as to use images that do not have defects. Although the image defect identification and correction systems 118, 120 are illustrated as being implemented "in the cloud" by the service provider system 102, this functionality may also be implemented in whole or in part locally by the computing device 104, e.g., as part of the image processing system 106. Further discussion of this and other examples is included in the following sections and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Image Defect Identification

Figure 2:
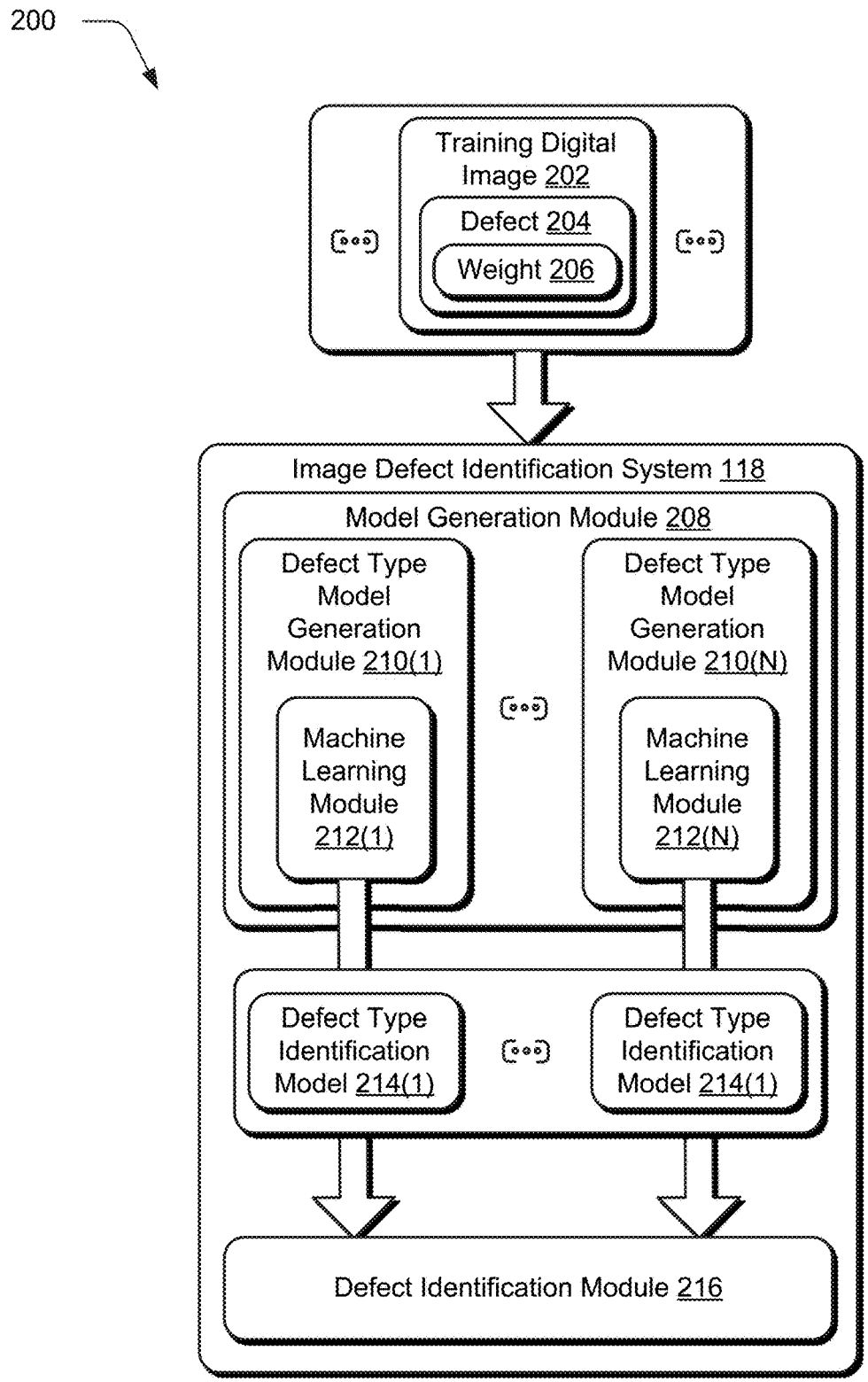
FIG. 2 depicts a system in an example implementation in which an image defect identification system of FIG. 1 is shown in greater detail as training several different defect type identification models using machine learning.
Figure 3:
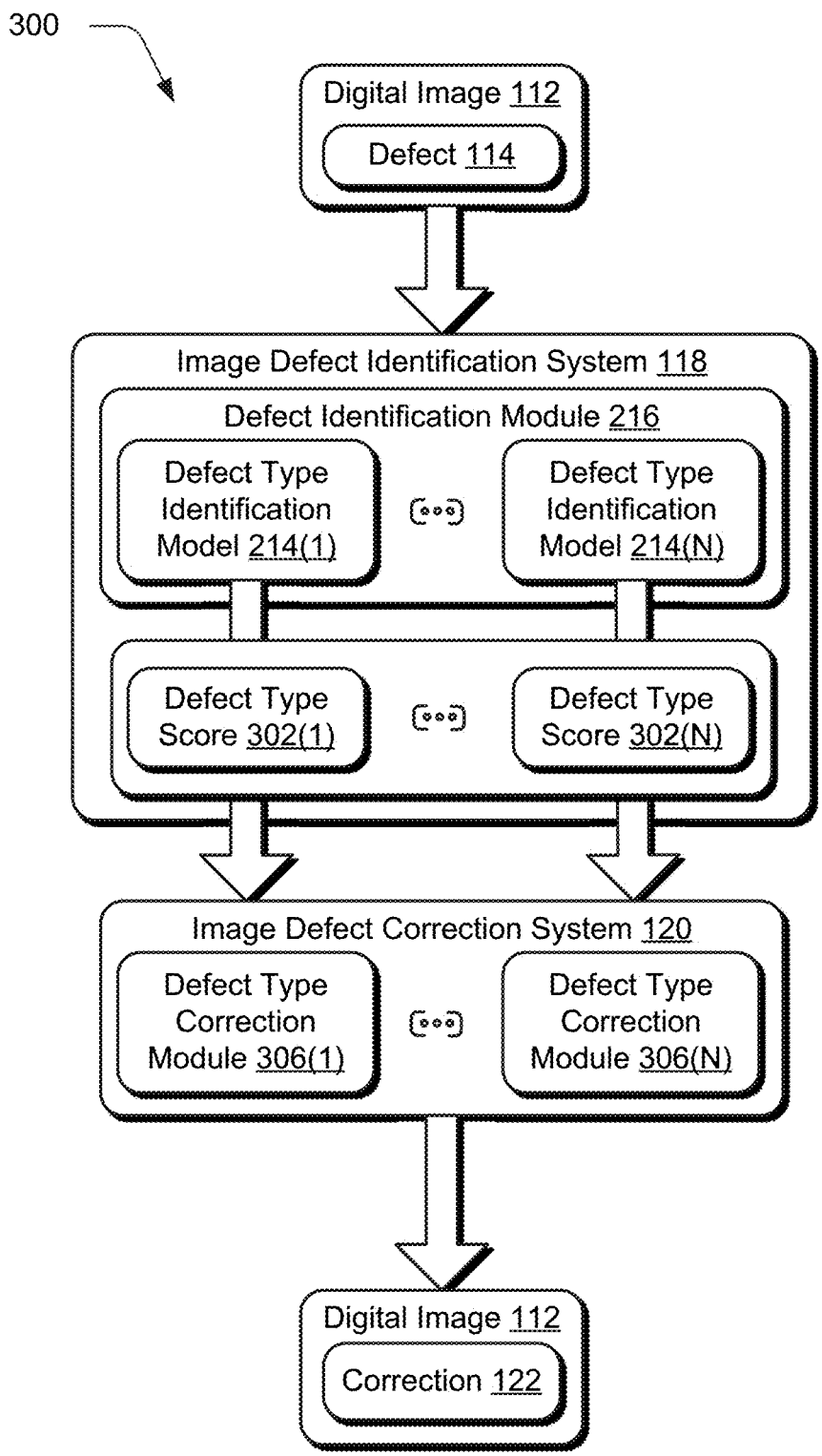
FIG. 3 depicts a system in another example implementation in which the image defect identification system of FIG. 1 is shown in greater detail as identifying a defect in a digital image using the several different defect type identification models of FIG. 2.
Figure 4:
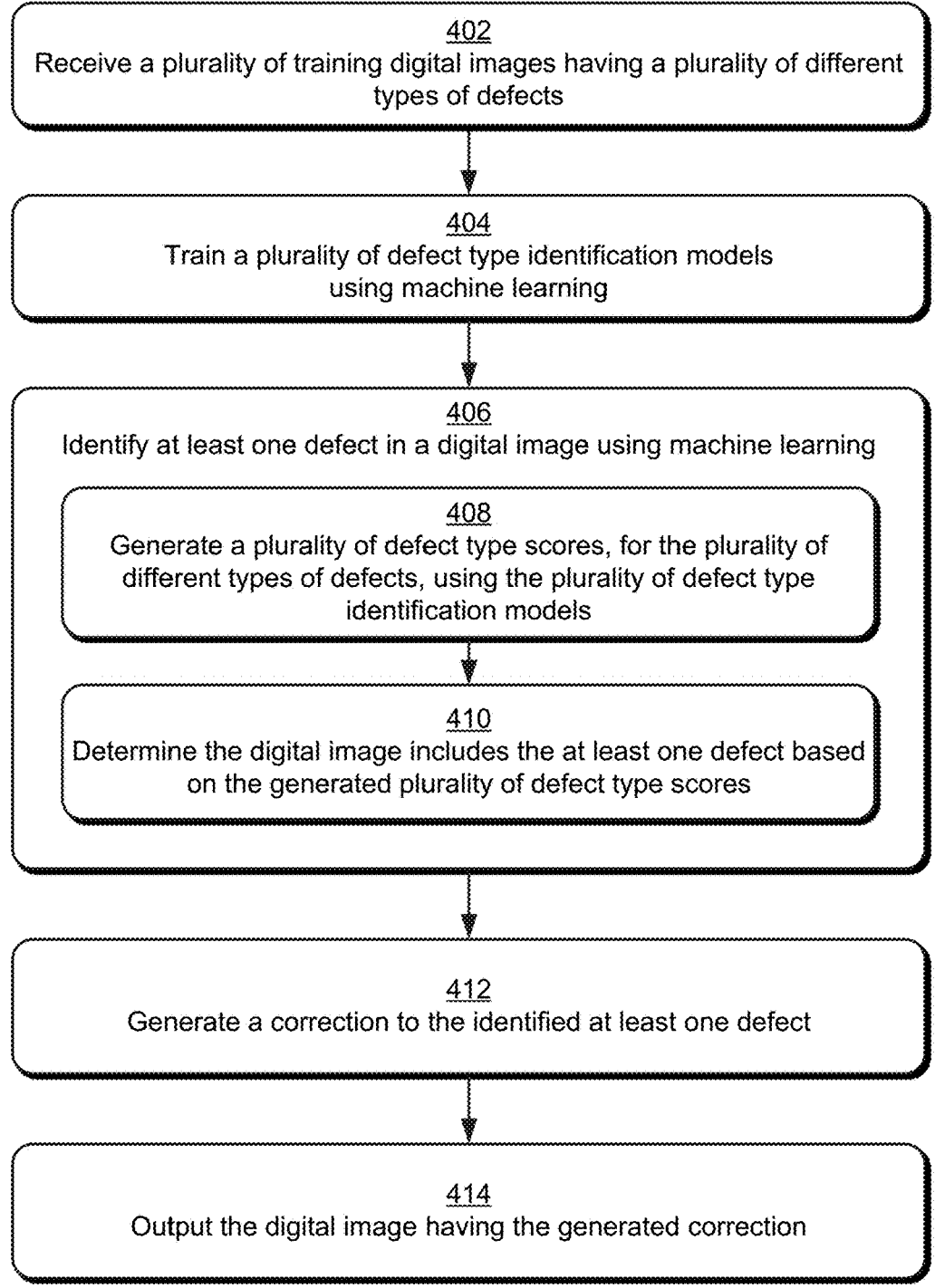
FIG. 4 is a flow diagram depicting a procedure in an example implementation in which defect type identification models are trained and used to detect at least one defect within a digital image.

FIG. 2 depicts a system 200 in an example implementation in which the image defect identification system 118 of FIG. 1 is shown in greater detail as training multiple defect type identification models using machine learning. FIG. 3 depicts a system 300 in an example implementation in which the image defect identification system 118 of FIG. 1 is shown in greater detail as identifying a defect in a digital image using the plurality of defect type identification models of FIG. 2. FIG. 4 depicts a procedure 400 in an example implementation in which defect type identification models are trained and used to detect at least one defect within a digital image.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 2-4.

Multiple training digital images 202 are received by the image defect identification system 118 that have multiple different types of defects 204 (block 402). The training digital images 202, for instance, may be tagged to identify a defect type 204 included in the image, such as exposure, white balance, saturation, noise, haze, blur, or composition. The defect type 204 may also include a weight 206 that indicates an amount of severity for the defect type 204, e.g., "severe," "mild," or "none." The weight 206, for instance, may be defined within a range of [−1.0, 1.0] to define an amount of the defect 204 exhibited by a respective training digital image 202. Each of the training digital images 202 may have more than one defect type 204 identified as well as more than one example of the defect 204. The training digital images 202 may be generated in a variety of ways, such as through receipt of user inputs via a user interface that is output by the image defect identification system 118 that identify the defect type 204 and a weight 206 (i.e., severity) of the defect 204.

Multiple defect type identification models are trained using machine learning (block 404) by the image defect identification system 118 using the training digital images 202. In the illustrated example, the image defect identification system 118 includes a model generation module 208. The model generation module 208 includes multiple defect type model generation modules 210(1), . . . , 210(N) that include respective machine learning modules 212(1), . . . , 212(N) to train respective defect type identification modules 214(1), . . . , 214(N) for respective types of defects as found in the training digital images 202.

Each of the defect type model generation modules 210 (1)-210(N), for instance, may be trained to identify a single respective defect type from multiple different defect types that may be observed in digital images, e.g., exposure, white balance, saturation, noise, haze, blur, or composition. This may be performed using a variety of different machine learning techniques, including use of convolutional and regression layers as part of a deep neural network, an example of which is described in greater detail in relation to FIG. 8. Additionally, two different types of inputs (e.g., globally downsized and patch based) may be formed from the training digital images 202 and used to define global and local defects to improve accuracy in identification of the defect 204 and may be employed for respective defect types, an example of which is described in relation to FIGS. 6-10.

The plurality of defect type identification models 214(1)-214(N) are then provided by the model generation module 208 to a defect identification module 216 to identify a defect within a digital image. At least one defect 114 is identified in the digital image 112 using machine learning (block 406) by the defect identification module 216. As illustrated in FIG. 3, for instance, a digital image 112 is received by the image defect identification system 118. A defect identification module 216 is used to process the digital image 112 as part of machine learning using the plurality of defect type identification model 214(1)-214(N).

As previously described, each of the plurality of defect type identification models 214(1)-214(N) corresponds to a respective one of plurality of different defects types. Through processing of the digital image 112 by each of these models, multiple defect type scores 302(1)-302(N) are generated, for the plurality of different defect types (block 408). The defect type scores 302(1)-302(N) define a likelihood that the digital image 112 includes a corresponding defect and a likely severity of that defect. For example, the defect type scores 302(1)-302(N) may define a value between zero and one for each of exposure, white balance, saturation, noise, haze, blur, and composition.

A determination may then be made that the digital image 112 includes the at least one defect 114 based on the generated plurality of defect type scores 302(1)-302(N) (block 410). The image defect identification system 118, for instance, may base this determination on a threshold set for each of the defect type scores 302(1)-302(N) individually, an aggregate score calculated from the defect type scores 302(1)-302(N) together, and so on. Further, the scores may define a localization of the defect within the digital image 112 (e.g., a defect "heat map" in which a likelihood of a relative pixel in the digital image 112 as including a defect is indicated) as further described in relation to FIG. 6.

A correction is generated by the image defect correction system 120 to the identified at least one defect (block 412) based on the identification of the defect 114. The image defect correction system 120, for instance, may include multiple defect type correction modules 306(1)-306(N) that correspond to the defects that are capable of being identified by the defect type identification models 214(1)-214(N). The defect type correction modules 306(1)-306(N), for instance, may be configured to generate a correction 122 (e.g., data used to transform an appearance of the defect 114 in the digital image 112) for a respective defect, such as exposure, white balance, saturation, noise, haze, blur, or composition. The digital image 106 having the generated correction 122 is then output (block 414) by the image defect correction system 120, e.g., for rendering in a user interface, storage, communication via a network 106, and so forth.

In this way, the image defect identification system 118 may identify existence of a defect 114 within the digital image 112 automatically and without user intervention, which is not possible using conventional techniques that rely on a user to manually do so. Additionally, this identification may also be used by an image defect correction system 120 to generate the correction 122 and apply it to the digital image 122 automatically and without user intervention, and thus provides an end-to-end solution for defect correction. Identification of the defect may be used to support a variety of other functionality, examples of which are described as follows and shown in a corresponding figure.

Figure 5:
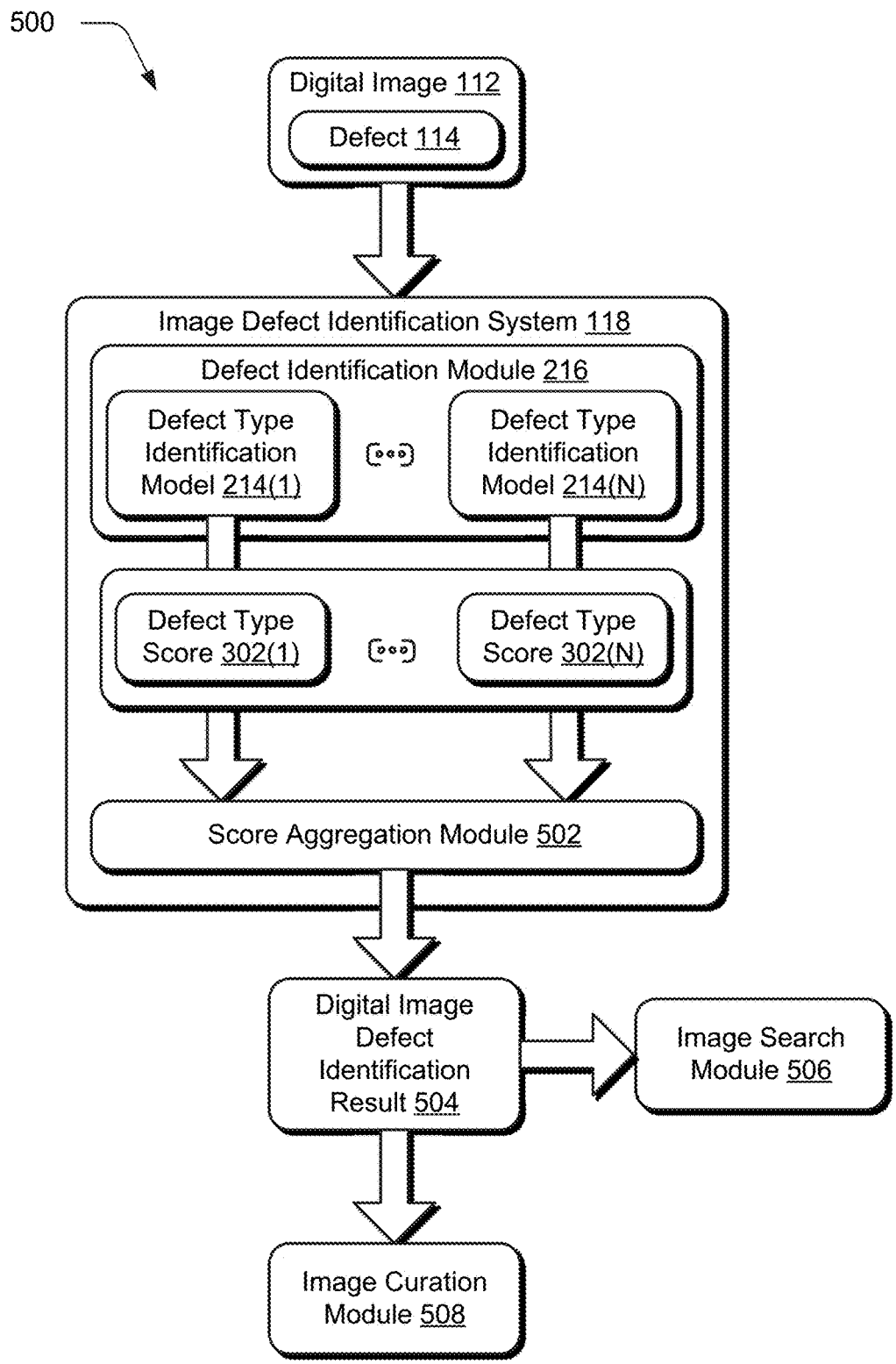
FIG. 5 depicts a system in an example implementation in which the image defect identification system of FIG. 1 is also shown in greater detail as identifying a defect in a digital image using the several different defect type identification models of FIG. 2.

In a system 500 of FIG. 5, the digital image 112 having the defect 114 is received as previously described. The defect identification module 216 employs multiple defect type identification models 214(1)-214(N) to generate corresponding defect type scores 302(1). In this instance, however, the defect type scores 302(1)-302(N) are provided to a score aggregation module 502 that is configured to generate a digital image defect identification result 504.

The digital image defect identification result 504, for instance, may provide an aggregate defect score for the plurality of defect type scores 302(1)-302(N) that is indicative of an overall amount of the defect 114 exhibited by the digital image 112. This may be used by an image search module 506 to exclude such images from a search result that have an overall defect amount that is greater than a threshold, by an image curation module 508 to likewise block digital images 112 having "significant" defects as defined by a threshold from inclusion as part of a curated collection of digital images, and so forth. The opposite may also be used to locate digital images having defects based on the defect type scores 302(1)-302(N), e.g., for particular types of defects, overall amount of defects, and so forth. A user, for instance, may initiate a search through interaction with the image search module 506 to locate images having an overall amount of defects over a threshold for removal of those digital images, e.g., to free storage space on a mobile phone and thus improve operation of the phone. A variety of other examples are also contemplated.

Figure 6:
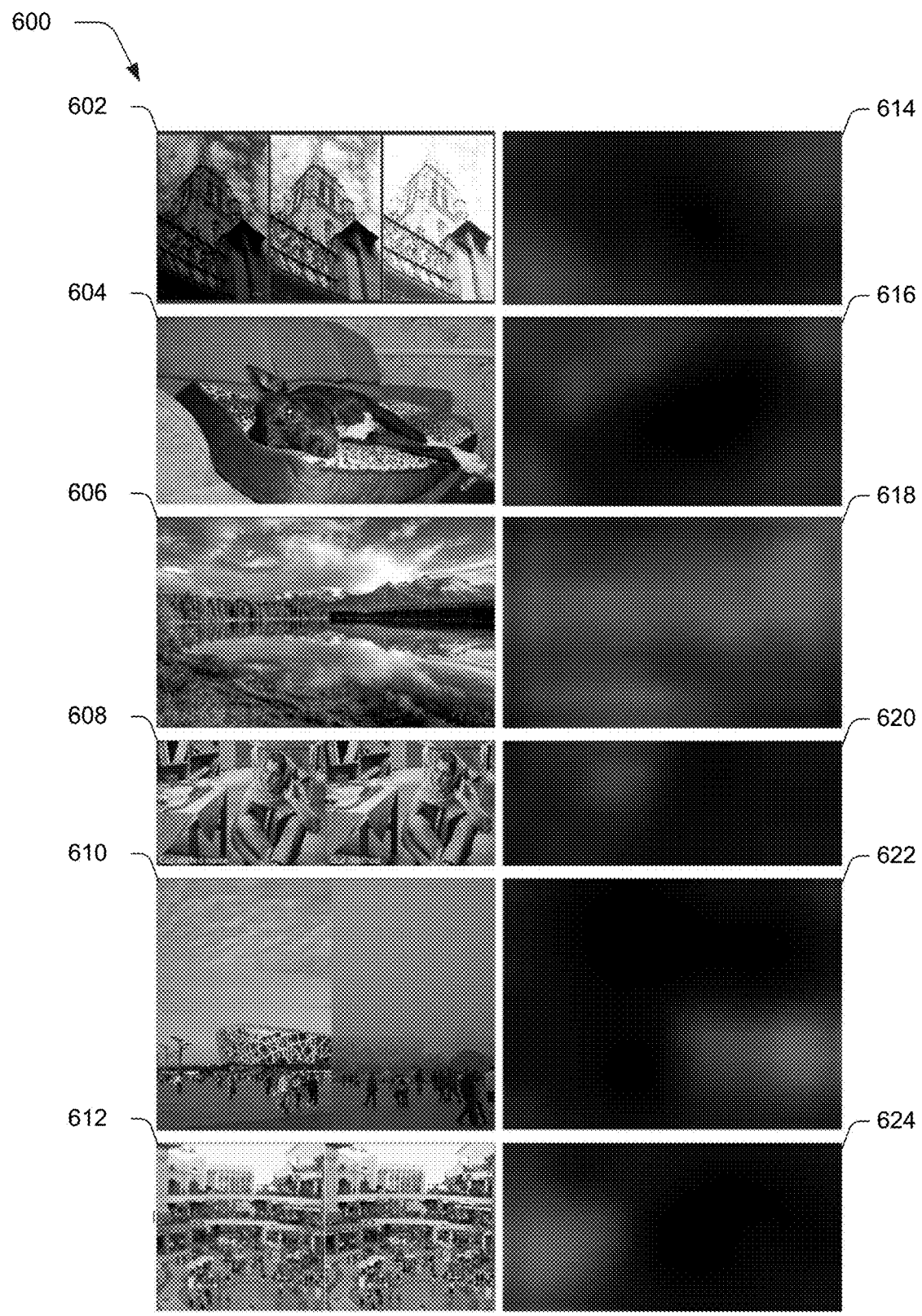
FIG. 6 depicts examples of localization of defects within digital images.

FIG. 6 depicts examples 600 of localization of defects within digital images. Localization refers to identification of a particular location (e.g., group of pixels) within the digital image 112 that includes a defect 114. This may be used to support a variety of functionality, such as to improve accuracy in generation of the correction 122 for the defect 114 by the image defect correction system 120, to identify the defect 114 in a user interface, and so on. Generation of the localization, for instance, may be performed by the defect identification module 216 through use of a fully convolution neural network (FCN) as part of generating the defect type scores 302(1)-302(N), output as a digital image defect identification result 504, and so forth.

In this example, digital images are illustrated as having different defects. Digital image 602 includes an example of bad exposure, digital image 604 of bad white balance, digital image 606 of bad saturation, digital image 608 of noise, digital image 610 of haze, and digital image 612 of undesired blur. Respective localizations 614, 616, 618, 620, 622, 624 are also illustrated as defining corresponding locations within the digital images 602-612 at which the defect is likely to occur as identified through machine learning, e.g., through use of a fully convolutional neural network.

Thus, when used as part of image correction the image defect correction system 120 may be accurately guided to "where" the defect 114 is located within the digital image 122, automatically and without user intervention. In this example, each of the defect type identification models 302(1)-302(N) is configured to identify different defect types, one to another. Each of these models may also be configured to include both a global defect model (e.g., holistic) and local defect model (e.g., patch based) for the different defect types to capture both global and fine-grain resolution details, which may be used to increased accuracy in identification of the defects by the system. An example of which is described in the following section and shown using corresponding figures.

Global and Local Digital Image Defect Identification

Figure 7:
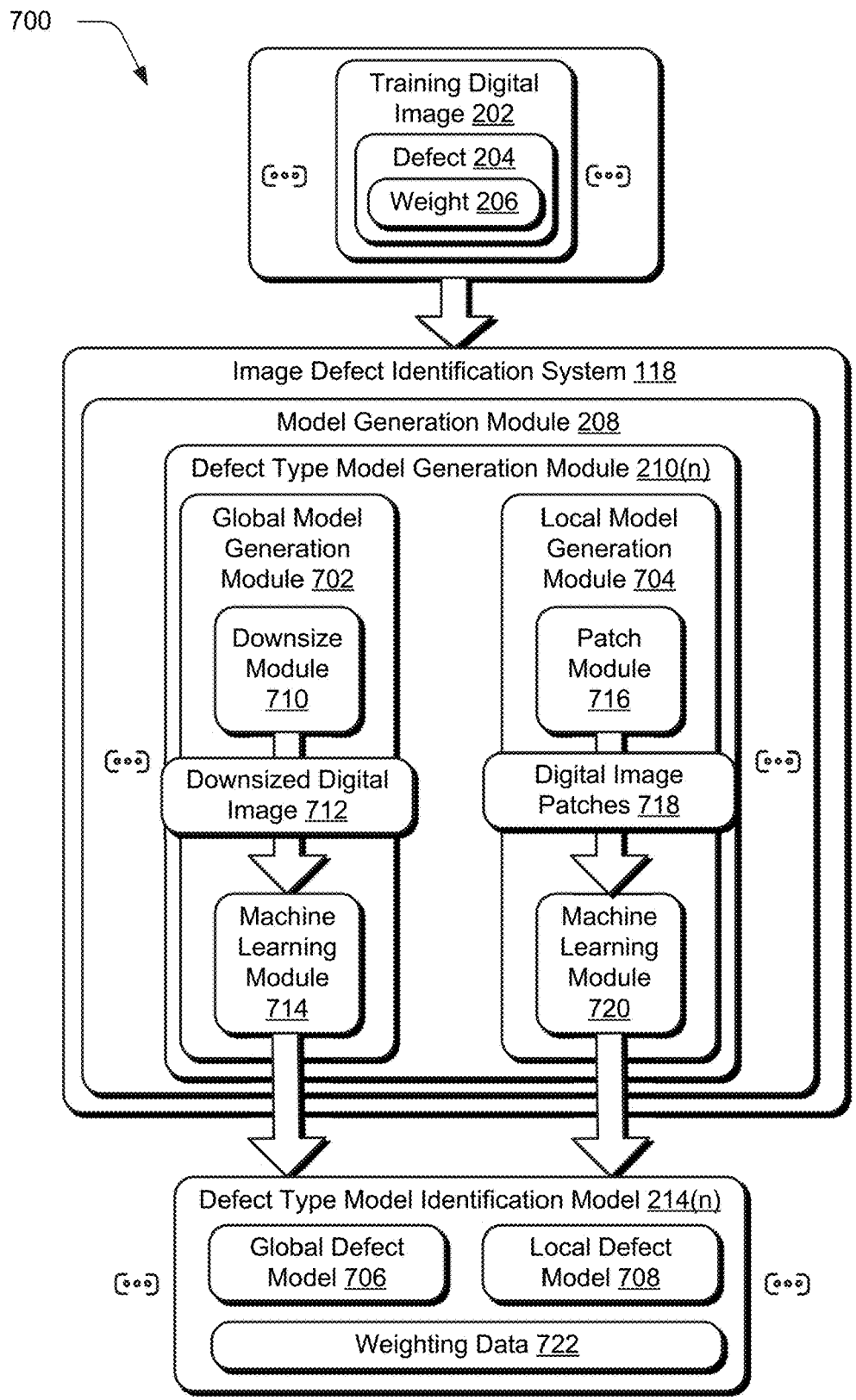
FIG. 7 depicts a system in an example implementation in which the image defect identification system of FIG. 1 is shown in greater detail as training a several different defect type identification models using machine learning as including both global and local defect models.
Figure 8:
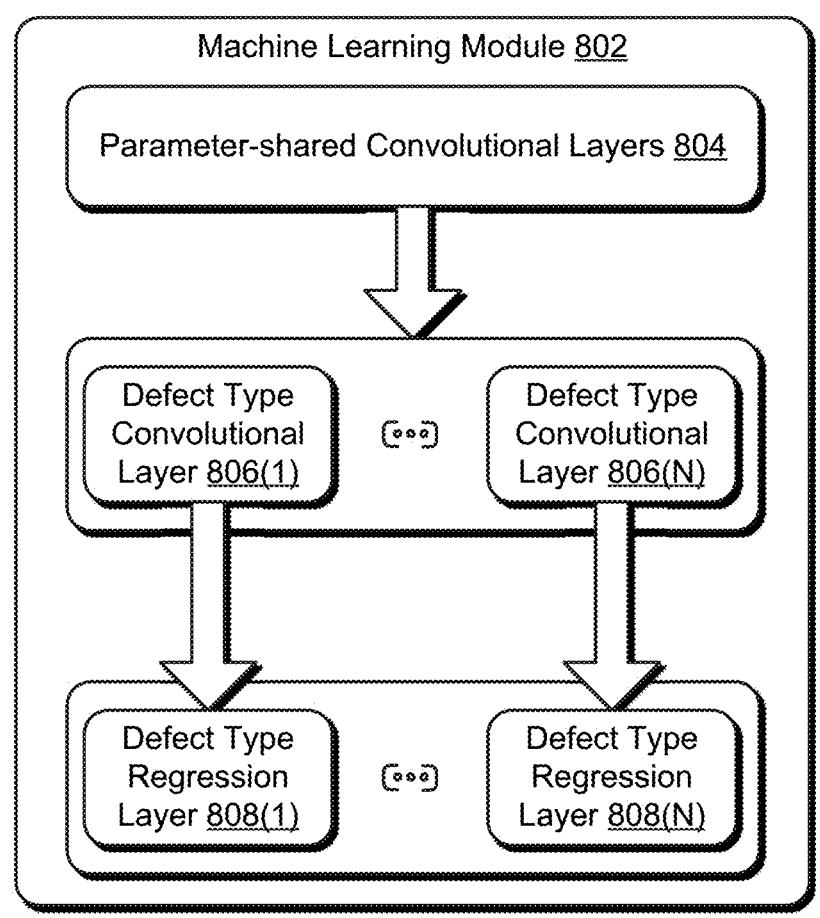
FIG. 8 depicts a system in an example implementation showing an example of a deep neural network configuration.
Figure 9:
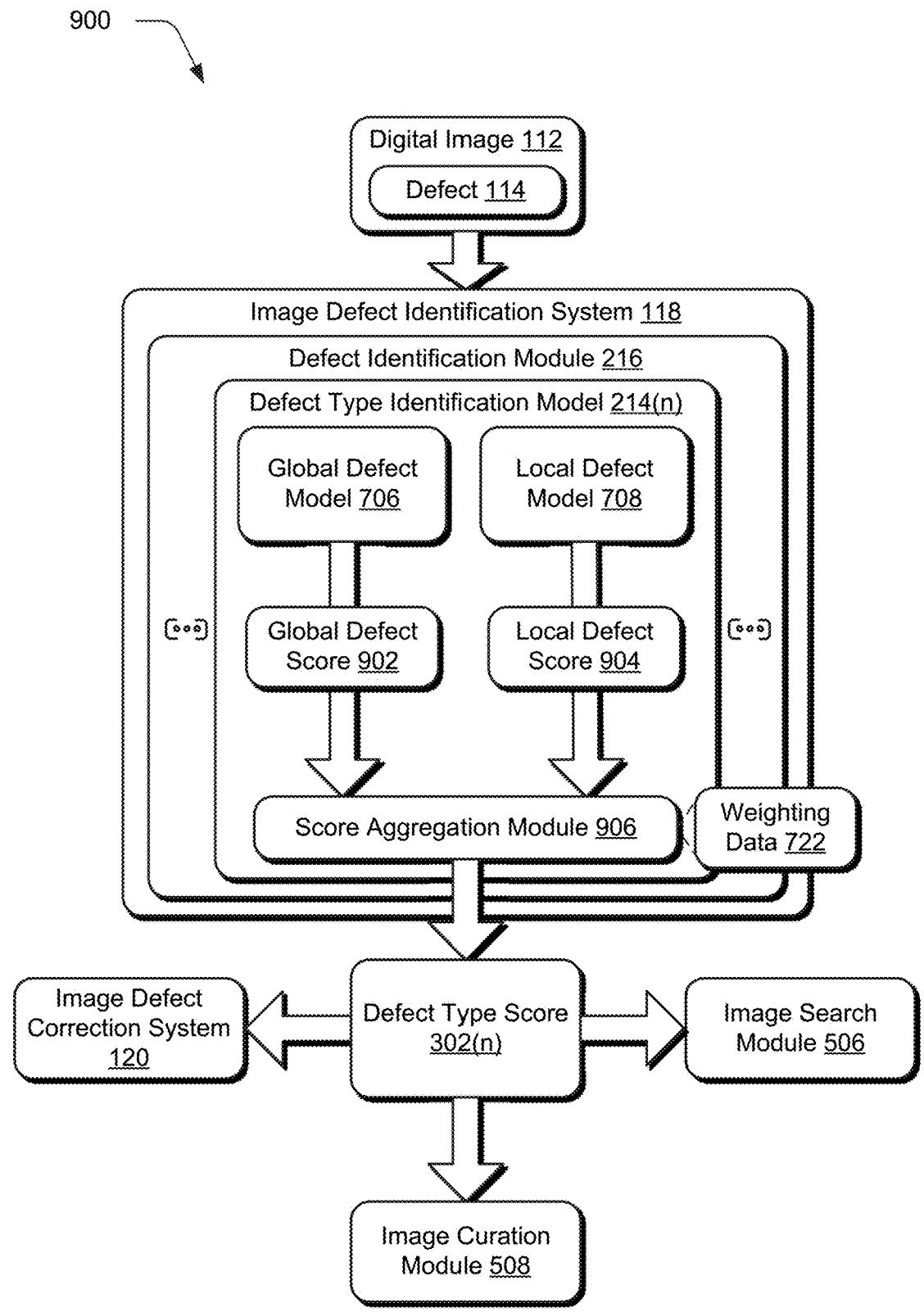
FIG. 9 depicts a system in an example implementation in which the global and local defect models of FIG. 7 are used to identify a defect within a digital image.
Figure 10:
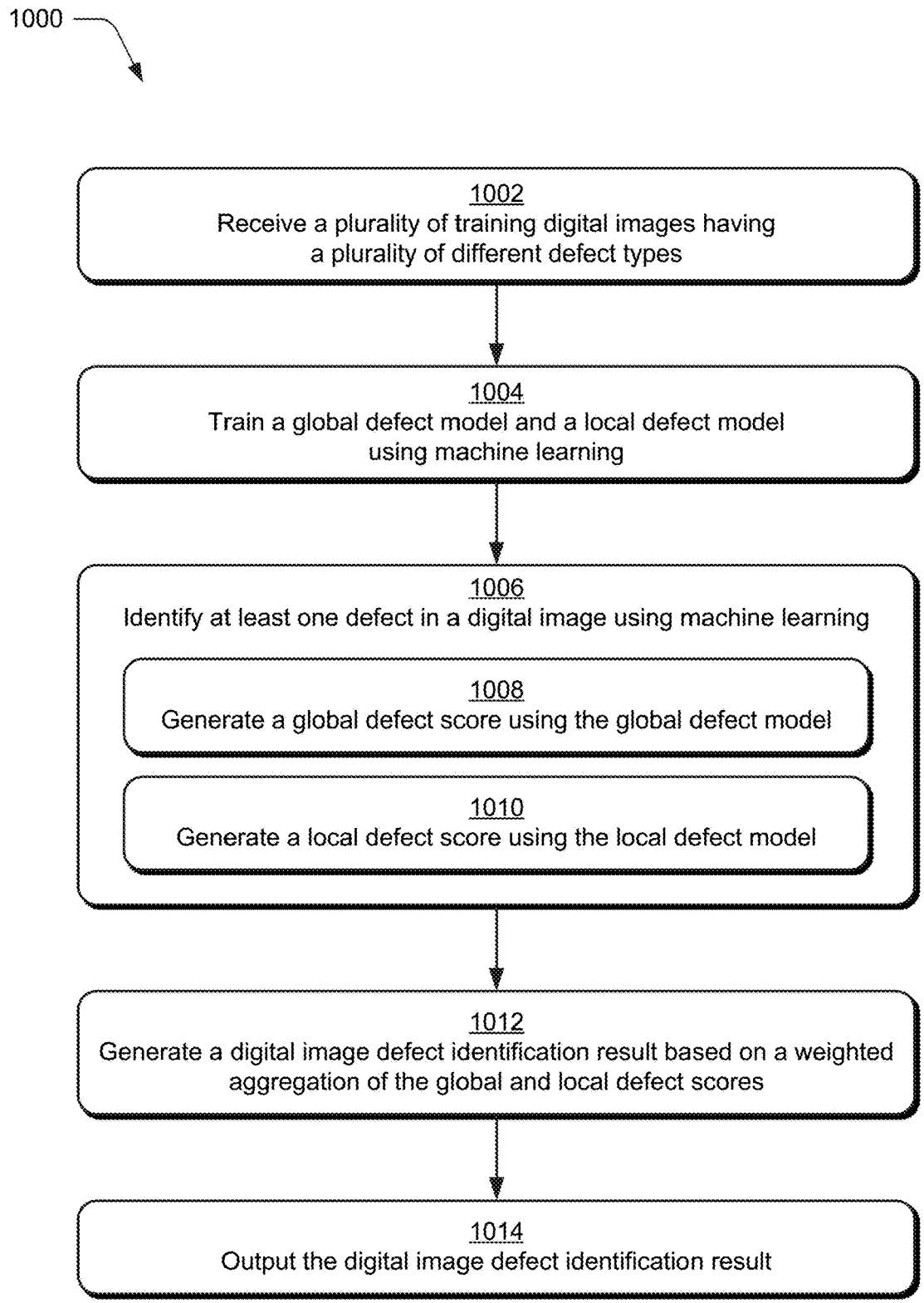
FIG. 10 is a flow diagram depicting a procedure in an example implementation in which global and local defect models of a defect type identification model are trained and used to detect at least one defect within a digital image.

FIG. 7 depicts a system 700 in an example implementation in which the image defect identification system 118 of FIG. 1 is shown in greater detail as training multiple defect type identification models using machine learning as including both global and local defect models. FIG. 8 depicts a system 800 in an example implementation showing an example of a deep neural network configuration. FIG. 9 depicts a system 900 in an example implementation in which the global and local defect models of FIG. 7 are used to identify a defect within a digital image. FIG. 10 depicts a procedure 1000 in an example implementation in which global and local defect models of a defect type identification model are trained and used to detect at least one defect within a digital image.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 7-10.

Like before, multiple training digital images are received that have multiple different defect types (block 1002). Each of the plurality of training digital images 202 includes at least one identified defect 204 and associated weight 206 as tag data as previously described. In the illustrated example of FIG. 7, the model generation module 208 includes a defect type model generation module 210(*n*) that is representative of any one of the defect type model generation modules 210(1), . . . , 210(N) of FIG. 2. For example, the defect type model generation module 210(*n*) may be configured for a corresponding one of multiple defect types, such as exposure, white balance, saturation, noise, haze, blur, or composition.

The defect type model generation module 210(*n*) includes both a global model generation module 702 and a local model generation module 704. These modules are configured to train global and local defect models 706, 708, respectively, using machine learning (block 1004) to identify defects based on global or detailed considerations.

The global model generation module 702, for instance, includes a downsize module 710 that is configured to form a downsized digital image 712 from the training digital images 202, e.g., to have an input size of 224×224×3, which may be used to conserve computational resources. The downsized digital images 712 are then provided to a machine learning module 714 for use as part of machine learning (e.g., convolution and regression layers as shown in FIG. 8) to generate the global defect model 706. Thus, in this example the global defect model 706 is able to address high level features within the training digital image 202 and corresponding defects that may not be readily identified from a detailed analysis, e.g., overexposure of the sky in a digital image.

The local model generation module 704, on the other hand, includes a patch module 716 that is configured to form digital image patches 718 from the training digital images 202. The digital image patches 718 may thus describe low-level features within the training digital image 202, e.g., local mean intensity, local variant, edges, texture patterns, and so on. The digital image patches 718 are then provided to a machine learning module 720 for use as part of machine learning (e.g., convolution and regression layers as shown in FIG. 8) to generate the local defect model 708. Consequently, the local defect model 708 in this example is configured to address low level features within the training digital image 202 and corresponding defects that may not be readily identified from a global analysis. The global and local defect models 706, 708 may then be employed as a defect type model identification model 214(*n*) to identify a corresponding defect type within a digital image as further described in relation to FIG. 10.

The global defect model 706 (e.g., holistic) and local defect model 708 (e.g., multi-patch input model) independently regress defect scores for each training digital image 202. Because each of these models encodes features and regresses scores complementarily from different scales (e.g., global and downsized versus local and fine-grained), a combination of the two models may be used to improve accuracy in identification of defects within an image. Accordingly, the model generation module 208 may also be configured to generate weighting data 722 that describes how to weight contributions of the global and local defect models 706, 708 in identifying a defect type.

Mathematically, for each defect time, a weighting is optimized by the model generation module 208 by solving the following expression via quadratic programming:

$$\min_{w^h, w^p} \sum_{i=1}^{N} (w^h s_i^h + w^p s_i^p - s_i^{gt})^2$$

$$s.t. \begin{cases} w^h + w^p = 1 \\ w^h, w^p \geq 0 \end{cases}$$

where "N" is the total number of training digital images 202, "$s_i^h$," "$s_i^p$," and "$s_i^{gt}$" represent a defect score of the "$i^{th}$" training digital image 202 from the global defect model 706, from the local defect model 708, and from ground truth, respectively. The optimization variables "$w_h$" and "$w_p$" represent a weight assigned for the global and local defect models 706, 708, respectively.

FIG. 8 depicts an example of an architecture employed by a machine learning module 802 to generate models using machine learning. The machine learning module 802 may be employed as part of either the machine learning module 714 used to generate the global defect model 706 or the machine learning module 720 employed to train the local defect model 708. The machine learning module 802 includes a parameter-shared convolutional layers 804 (e.g., with eight inceptions) and layers corresponding to each defect type, individually, which include a defect type convolutional layer 806(1)-806(N) (e.g., with two inceptions), and defect type regression layers 808(1)-808(N) (e.g., with a hidden layer).

In an example of training the global defect model 706, a neural network (e.g., GoogleNet) is employed using downsized training images as previously described. The neural network is configured such that two existing auxiliary classifiers and fully connected layer are removed, as well as a convolution incarnation (e.g., 5×5) from a last inception. Half the number of output neurons in the last convolution layers are removed in the remaining incarnations of the last inception, so as to decrease a size of the output features of the last inception from 1,024 to 176.

In one example, a batch normalization layer follows each convolutional layer to support higher learning rates and decreased initialization sensitivity. The early eight inceptions as part of parameter shared convolutional layers 804 share parameters for each of the defect regression tasks. Defect type regression layers 808(1)-808(N) are separated into individual branches for each defect type. The branches have identical architecture and pre-trained parameter initialization, with a fully connected layer (with 128 hidden neurons) at the end before regression to increase defect-wise capacity. Additionally, the final classification layers are replaced with regression layers, such that the number of output neurons of the last fully connection layer is reduced from 1,000 to 1. A Euclidean loss layer is also included as part of the defect type regression layer 808(1)-808(N), with losses for each defect type having the same weight.

When used to generate the local defect model 708, the same architecture is employed and includes defect-specific branches of input layers. Multi-patch sampling may be used to increase balance in a histogram in the mean of data augmentation. Given one defect score histogram of a certain defect, different numbers of local patches (with the original resolution) may be sampled for different bins. Generally, the number of samples formed is inversely proportional to the histogram, e.g., with 21 bins for a bad saturation defect and 11 bins for other defects, so that the histogram after sampling may be balanced over all bins.

In some instances, the number of samples falling into a particular bin (e.g., [0.95, 1.05] is smaller by three magnitudes than that falling into other bins, e.g., [−0.05, 0.05]. Also, sampling of too many patches may lead to overlaps and information redundancy. Thus, the maximum number of sampled patches may be capped to 50 in one example. In order to ensure the representativeness of patch sampling, the minimal number of patches is clipped to 5. Under these rules, some bins may reach the maximum number while others do not, even though each of the images in those bins are sampled for the maximal times.

Accordingly, different sample strategies may be employed based on different original histograms of different defect scores to result in a different multi-patch input training set. For example, giving one training digital image 202, different numbers of local patches may be sampled for different defects. As a consequence, this model does not only have multiple defect-specific regression outputs but also has multiple defect-specific inputs for training.

For example, six defect-specific branches (e.g., excluding bad composition) may load patches with a same batch size form different training sets. These are then concatenated together in the batch dimension as the input to the parameter-shared layers for joint training. During the branching operation, the feature maps are equally sliced in the batch dimension for the six branches in the same order as concatenation. This differs from the branching operation employed for the global defect model 706. The defect-specific layers are trained over $1/7$ as many images as for the parameter-shared layers. Thus, this model may be regarded as a group of six separate network, each of which is trained for one defect and share parameters at the parameter-shared convolutional layers 804.

Referring now to FIG. 9, at least one defect in a digital image is identified using machine learning (block 1006) by the image defect identification system 118. The image defect identification system 118 employs a defect identification module 126 as previously described. In the illustrated example, a defect type identification module 214(n) is illustrated that is representative of any one of the defect type identification modules 214(1), . . . , 214(N) of FIG. 2.

The defect type identification module 214(n) employs the global defect module and the local defect model 708 to generate corresponding global and local defect scores 902, 904 using machine learning (blocks 1008, 1010). This may include use of down sampling and formation of patches as previously described in relation to FIG. 7. The global and local defect scores 902, 904 are then aggregated by the score aggregation module 906 (e.g., using the weighting data 722) to generate a corresponding defect type score 302(n) as a digital image defect identification result for a respective defect type (block 1012). The defect type score 302(n) for each of the different defect types may be used in a variety of ways as previously described, such as by an image defect correction system 120, image search module 506, image curation module 508, and so on. Thus, in this example global and local analysis may be leveraged to identify a defect 114 in an image 112.

Example System and Device

Figure 11:
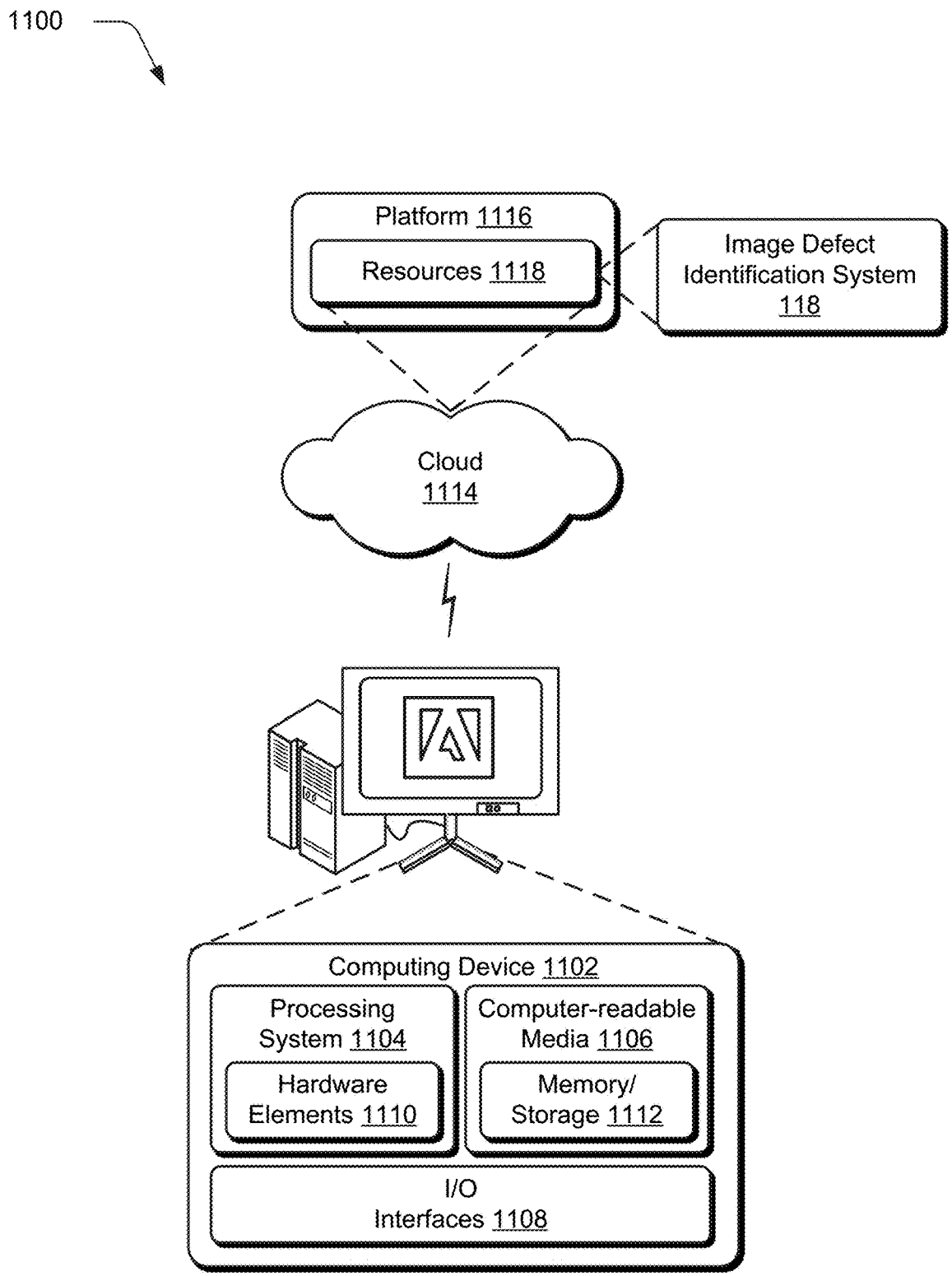
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the image defect identification system 118. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to identify and correct a digital image defect, a method implemented by at least one computing device, the method comprising:
    identifying, by the at least one computing device, a defect in a digital image using machine learning, the identifying including:
    generating a plurality of defect type scores for a plurality of different defect types using a plurality of defect type identification models, the plurality of defect type identification models implemented as part of machine learning using a plurality of neural networks, respectively, having defect type regression layers separated into individual branches, respectively, for the plurality of different defect types at least one defect type score of the plurality of defect type scores generated by aggregating, based on a weighting:
        a global defect score that captures global resolution details of the digital image for a respective said defect type; with
        a local defect score generated from patches taken from the digital image that captures fine-grain resolution details for the respective said defect type;
    determining that the digital image includes the defect based on the generated plurality of defect type scores;
    generating, by the at least one computing device, a correction for the identified defect; and
    outputting, by the at least one computing device, the digital image as including the generated correction.

2. The method as described in claim 1, further comprising training, by at least one computing device, the plurality of defect type identification models using machine learning based on a plurality of training digital images, each said training image having an identified defect type and weight indicating an amount of severity for the identified defect type.

3. The method as described in claim 1, wherein the plurality of different defect types include exposure, white balance, saturation, noise, haze, blur, or composition.

4. The method as described in claim 1, wherein the global defect score is generated from a downsized version of the digital image.

5. The method as described in claim 1, wherein the determining that the digital image includes the defect includes applying a weighting to the global defect score or the local defect score of the plurality of defect type scores.

6. The method as described in claim 1, wherein at least one defect type score of the plurality of defect type scores defines a localization within the digital image.

7. The method as described in claim 6, wherein the generating of the correction is based at least in part of the localization.

8. In a digital medium environment to identify a digital image defect in a digital image automatically and without user intervention, a system comprising:
    means for training a plurality of defect type identification models to identify a plurality of defect types, respectively, using machine learning based on a plurality of training digital images; and
    means for identifying a defect type of the plurality of defect types in a digital image using machine learning, the identifying means including:
        means for generating a plurality of defect type scores for a plurality of different defect types using the plurality of defect type identification models as part of machine learning using a plurality of neural networks having defect type regression layers separated into individual branches, respectively, for the plurality of defect types, at least one defect type score of the plurality of defect type scores by aggregating, based on a weighting, a global defect score that captures global resolution details of the digital image for a respective said defect type with a local defect score generated from patches taken from the digital image that capture fine-grain resolution details for the respective said defect type; and
    means for determining the digital image includes the defect based on the generated plurality of defect type scores.

9. The system as described in claim 8, further comprising means for training the plurality of defect type identification models to identify a plurality of defect types, respectively, using machine learning based on a plurality of training digital images.

10. The system as described in claim 8, further comprising means for generating a correction to the identified defect type.

11. The system as described in claim 9, wherein each said training image includes a weight indicating an amount of severity for the identified defect type.

12. The system as described in claim 8, wherein the plurality of different defect types includes exposure, white balance, saturation, noise, haze, blur, or composition.

13. A computer-readable storage medium having instructions stored thereon that, responsive to execution by a computing device, causes the computing device to perform operations comprising:
    identifying a defect in a digital image using machine learning, the identifying including:
    generating a plurality of defect type scores for a plurality of different defect types using a plurality of defect type identification models, the plurality of defect type identification models implemented as part of machine learning using a plurality of neural networks, respectively, having defect type regression layers separated into individual branches, respectively, for the plurality of different defect types, at least one defect type score of the plurality of defect type scores generated by aggregating, based on a weighting:
        a global defect score that captures global resolution details of the digital image for a respective said defect type; with
        a local defect score generated from patches taken from the digital image that captures fine-grain resolution details for the respective said defect type;
    determining that the digital image includes the defect based on the generated plurality of defect type scores;
    generating a correction for the identified defect; and
    outputting the digital image as including the generated correction.

14. The computer-readable storage medium as described in claim 13, further comprising training the plurality of defect type identification models using machine learning based on a plurality of training digital images, each said training image having an identified defect type and weight indicating an amount of severity for the identified defect type.

15. The computer-readable storage medium as described in claim 13, wherein the plurality of different defect types includes exposure, white balance, saturation, noise, haze, blur, or composition.

16. The computer-readable storage medium as described in claim 13, wherein the global defect score is generated from a downsized version of the digital image.

17. The computer-readable storage medium as described in claim 13, wherein the operation of determining that the digital image includes the defect includes applying a weighting to a global defect score or a local defect score of the plurality of defect type scores.

18. The computer-readable storage medium as described in claim 13, wherein at least one defect type score of the plurality of defect type scores defines a localization within the digital image.

19. The computer-readable storage medium as described in claim 18, wherein the operation of generating the correction is based at least in part of the localization.

* * * * *